Sept. 7, 1926.  1,598,832
C. W. VAN RANST
BRAKE FOR TURNING WHEELS
Filed May 13, 1922    2 Sheets-Sheet 1
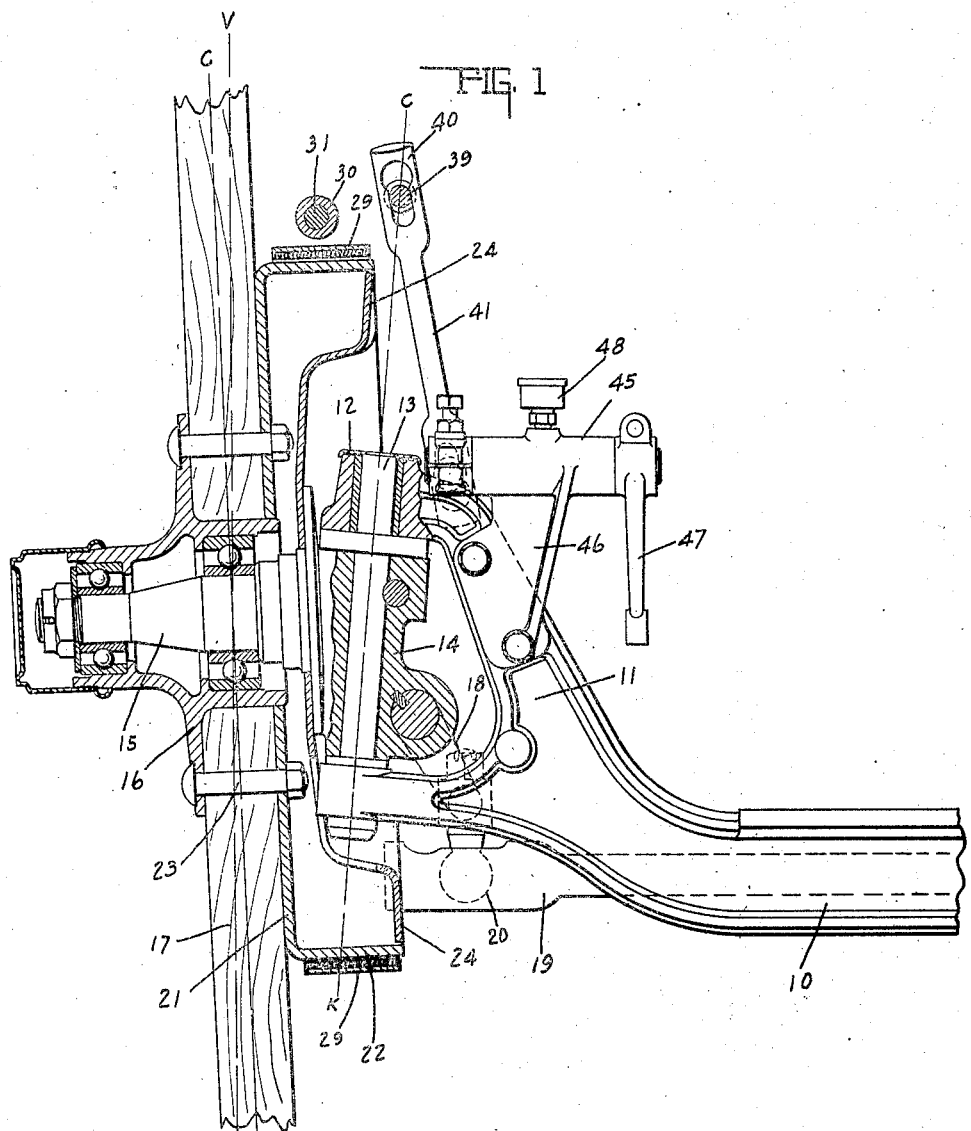
INVENTOR.
CORNELIUS W. VAN RANST.
BY
ATTORNEYS Sept. 7, 1926.                C. W. VAN RANST              1,598,832
                          BRAKE FOR TURNING WHEELS
                          Filed May 13, 1922      2 Sheets-Sheet 2
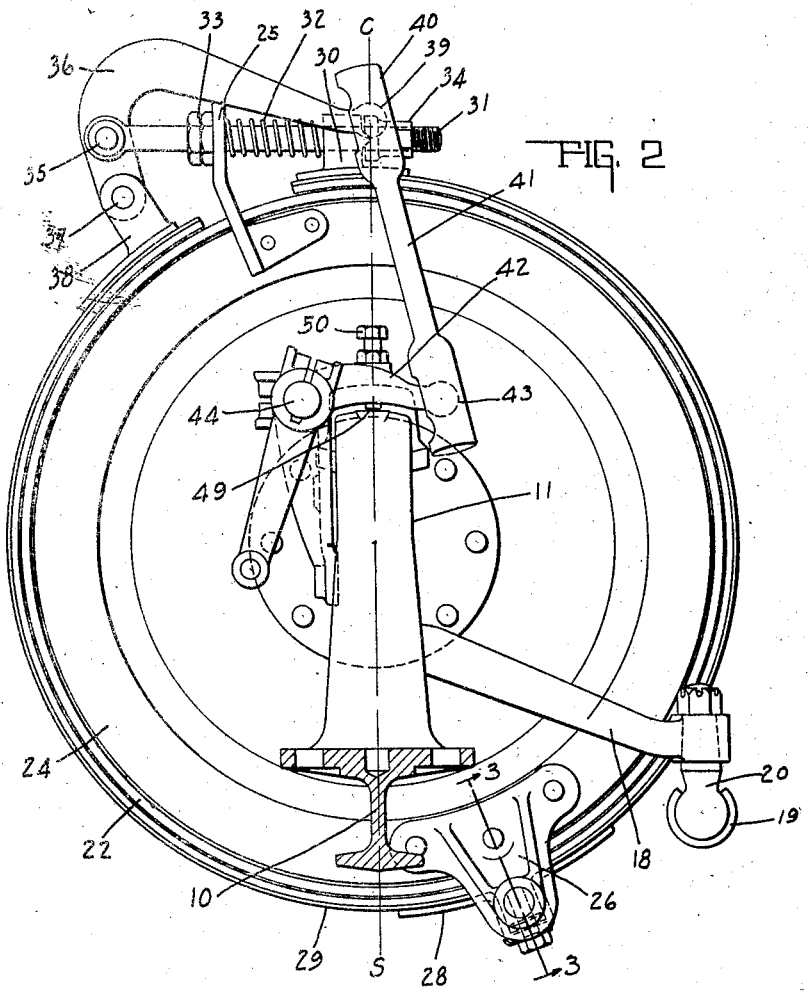
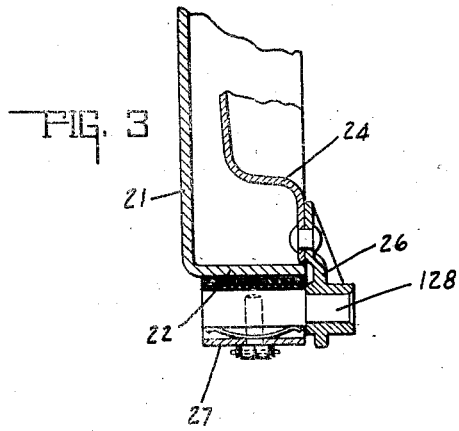
INVENTOR.
CORNELIUS W. VAN RANST.
BY
ATTORNEYS Patented Sept. 7, 1926.

1,598,832

UNITED STATES PATENT OFFICE.

CORNELIUS W. VAN RANST, OF INDIANAPOLIS, INDIANA.

BRAKE FOR TURNING WHEELS.

Application filed May 13, 1922. Serial No. 560,589.

This invention relates to a dirigible vehicle wheel and an external brake therefor.

The chief object of this invention is to provide a dirigible vehicle wheel with an external brake, whereby the dirigibility of the wheel will not interfere with the operation of the brake, nor the mechanism for operating the brake interfere with the dirigible movement of the wheel.

The chief feature of the invention is to provide an external brake for a dirigible wheel and so associate the same that there will be no interference therebetween, which association is obtained by positioning a portion of the brake actuating means upon the center line of the dirigible king pin.

The full nature of the invention will be understood from the accompanying drawings and the following description and claim.

In the drawings, Fig. 1 is a central cross sectional view of a dirigible wheel construction provided with an external brake and actuating means therefor. Fig. 2 is a side elevational view of the brake construction and the wheel support. Fig. 3 is a sectional view taken on the line 3—3 of Fig. 2 and shows the anchoring of the external brake. Fig. 4 is a top plan view of the external brake actuating mechanism.

In the drawings 10 indicates an I beam which at its end is provided with a yoke portion 11. Each of the arms of the yoke 11 provides a bearing 12, and said bearings are in alignment with each other to receive the upper and lower ends of the king pin 13. The king pin 13 is rigidly secured to the spindle bracket or socket 14, as shown, and the spindle portion 15 rotatably supports a hub 16, which in turn supports the wheel structure through the medium of the spokes 17. The spindle bracket 14 is connected by a lever or spindle arm 18 with the usual tie rod 19 through a ball and socket construction indicated generally by the numeral 20. All of the foregoing is old in the art of dirigible wheels and constitutes no part of the invention. It will be noted herein that a vertical plane to the ground through the wheel is indicated by the line V—L; while the center line of the plane of the wheel is indicated by the line C—W. As shown clearly in Fig. 1, it will be noted that the wheel is inclined to the vertical as in the customary manner. The center line of the king pin is also illustrated in Fig. 1 by the line C—K and is inclined to the vertical as shown. The center lines C—W and C—K, see Patent No. 932,234, are herein shown in such relation that they would intersect, if prolonged, with the ground line of the wheel. Although such last intersection is not essential for some features of the invention, the same is preferred; for still other features of the invention, the aforesaid center lines, do not necessarily intersect, see Patent No. 946,145.

The external brake comprises a drum 21 having the peripheral portion 22 thereof. The drum 21 is herein shown suitably secured to the dirigible wheel construction by the bolts 23 which secure the hub construction to the spokes. Thus the drum 21 rotates with the wheel, and, of course, is movable therewith. The spindle 15 stationarily supports the plate 24 which cooperates with the drum and is positioned adjacent thereto. The plate 24 supports a pair of brackets 25 and 26. The bracket 26 constitutes a support for the anchor plate or strap 27, said strap being supported at 128 in said bracket. The anchor plate or strap is provided with an arcuate portion 28 which carries an external band brake which encircles the drum 21 and which has its ends positioned adjacent each other and the bracket 25. One end of the band brake supports the slotted bracket 30, and said slotted bracket slidably supports a threaded rod 31. Interposed between the bracket 25, which also slidably supports said rod 31, and the bracket 30 is a coiled spring 32. The initial position of the rod 31 with respect to the bracket 30 and the bracket 25 is determined by the adjusting and locking nuts 33 and by the locking nuts 34. The other end of the bolt member 31 is pivotally supported at 35 upon an arcuate lever or hook 36, one end of which is pivotally supported at 37 in a bracket 38 secured to the other end of the band 29. The lever 36 terminates in a ball 39 which is receivable by the socket 40 formed in one end of a link rod 41.

As shown clearly in Fig. 2 a vertical plane passing through the center line of the spindle is indicated by the letters C—S and it will be observed that the ball end 39 of the lever 36 is positioned at or approximately in the center line of the king pin and also in the plane indicated by the center line C—S, so that dirigible movement of the wheel will not affect or actuate in any way the brake actuating mechanism, and conversely actuation of the brake actuating mechanism will not cause dirigible movement of the dirigible wheel; or both movements may occur simultaneously without interference with each other.

Means for actuating the link rod 41 so as to elevate the same and thereby tilt the lever 36 upon the movable pivot 35 so as to draw the bracket 38 upwardly and towards the bracket 30 and to draw the bracket 30 downwardly and towards the bracket 38 comprises a lever 42 having a ball 43 associated with the other end of the link rod 41. The lever 42 is associated with a rock shaft 44, and said shaft is supported in a bearing 45 which is herein shown integral with a bracket 46 supported upon the yoke 11 of the I beam axle. The rock shaft 44 is rocked by means of a lever 47 secured to the opposite end thereof. Suitable lubricating means 48 is associated with the rock shaft and bearing 45 as shown. Herein the I beam is shown provided with a boss 49 and supported by and extending through the lever 42 is an adjusting pin or bolt 50 for regulating or adjusting the lowermost position of the link rod 41. When the brake is in non-braking relation, the link rod 41 is in the position shown in Figs. 1 and 2, and in said position the spring 32 through the nut 33 tends to maintain the brake band 29 in the open, released or non-gripping position. Simultaneously the lever 36 is positioned such that the bracket 38 is also moved downwardly and outwardly away from the brake drum, thereby maintaining the brake band in the non-gripping or braking position. The tension of the spring 32 may be adjusted by the nut 34 or by the nuts 33.

The invention claimed is:

A dirigible wheel construction including a dirigible wheel, an inclined spindle rotatably supporting the same, an inclined king pin pivotally supporting said spindle and wheel for dirigibility, a brake drum secured to the wheel, a brake band enveloping the drum and connected intermediate its ends to the spindle, an anchorage at each end of the band, a lever pivotally connected at one end to an anchorage, a rod stationarily mounted at one end in the other anchorage, a member carried by the spindle and interposed between the anchorages and receiving said rod, means on the rod for securing a bearing upon the member, the other end of the rod serving as a fulcrum for said lever, yielding means interposed between the rod supporting anchorage and the member, an operating lever pivotally mounted on the king pin support, said first mentioned lever having an offset portion terminating coincident with the spindle mounting axis, and means connecting the ends of the levers for brake operation independent of wheel dirigibility.

In witness whereof, I have hereunto affixed my signature.

CORNELIUS W. VAN RANST.